United States Patent [19]

Franke et al.

[11] Patent Number: 4,603,098

[45] Date of Patent: Jul. 29, 1986

[54] ELECTROPHOTOGRAPHIC RECORDING MATERIAL

[75] Inventors: Werner Franke, Wiesbaden; Richard Brahm, Ingelheim, both of Fed. Rep. of Germany

[73] Assignee: Hoechst Aktiengesellschaft, Frankfurt am Main, Fed. Rep. of Germany

[21] Appl. No.: 699,305

[22] Filed: Feb. 7, 1985

[30] Foreign Application Priority Data

Feb. 8, 1984 [DE] Fed. Rep. of Germany ....... 3404365

[51] Int. Cl.$^4$ .............................................. G03G 5/09
[52] U.S. Cl. ........................................ 430/83; 430/75
[58] Field of Search ............................. 430/83, 79, 75

[56] References Cited

U.S. PATENT DOCUMENTS

| 3,066,023 | 11/1962 | Schlesinger | 96/1 |
| 3,148,982 | 9/1964 | Ghys | 96/1 |
| 3,881,926 | 5/1975 | Ohlschlager et al. | 430/83 X |
| 3,958,991 | 5/1976 | Jones | 96/1.6 |
| 4,386,146 | 5/1983 | Kishino et al. | 430/95 |
| 4,435,492 | 3/1984 | Suzuki et al. | 430/83 X |

FOREIGN PATENT DOCUMENTS 704141 2/1941 Fed. Rep. of Germany .

*Primary Examiner*—John D. Welsh
*Attorney, Agent, or Firm*—Schwartz, Jeffery, Schwaab, Mack, Blumenthal & Evans

[57] ABSTRACT

An electrophotographic recording material is described which comprises an electrically conductive support and a photoconductive layer comprising a photoconductor, a binder, and at least one bis-benzothiazole-pentamethine-cyanine having a particular structure. The aforementioned recording material displays a sensitization peak in the range between about 680 nm and 710 nm, and can be processed under visual control using bright safelights.

11 Claims, 1 Drawing Figure

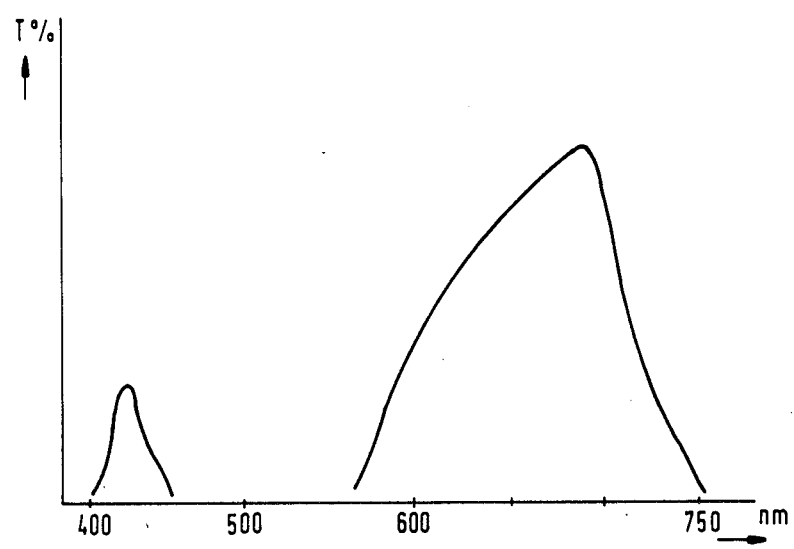
FIG.

ELECTROPHOTOGRAPHIC RECORDING MATERIAL

BACKGROUND OF THE INVENTION

The present invention relates to an electrophotographic recording material comprising an electrically conductive support and a photoconductive layer which comprises a photoconductor, a particular cyanine dye serving as the sensitizing dye, a binder, and customary additives.

In electrophotographic reproduction processes, it is known to use photoconductors that are radiation-sensitive up to the short-wave visible portion of the spectrum and that display a radiation-sensitivity in the visible portion of the spectrum which can be extended by adding one or more sensitizing dyes capable of transmitting the energy of longer-wavelength light to the photoconductor. Such sensitizing dyes include dyes of a wide variety of chemical types.

German Auslegeschrift No. 2,526,720 (corresponding to U.S. Pat. No. 4,063,948) discloses an electrophotographic recording material for an electrophotographic reproduction process, in which the photoconductive layer contains a cyanine dye that sensitizes in the blue spectral region. With a sensitization of this type it is, however, impossible to utilize the energy of light sources emitting light with a high red fraction such as, for example, incandescent lamps.

From German Offenlegungsschrift No. 1,447,907 (corresponding to U.S. Pat. No. 3,458,310), it is known to sensitize photoconductor layers up to the visible red. For this purpose, dye mixtures of, for example, Acridine Yellow, Acridine Orange, Rhodamine and and Brilliant Green are used, which are added either together in one layer or separately in different layers, as disclosed in German Offenlegungsschrift No. 2,353,639 (corresponding to U.S. Pat. No. 3,992,205) and in which the actions of the individual dyes either add up or a different sensitization occurs, as disclosed in German Offenlegungsschrift No. 2,817,428 (corresponding to U.S. Pat. No. 4,252,880).

Panchromatic sensitizations of this kind offer advantages, in that light sources having a high red fraction, which are used in reproduction techniques, are better utilized. In practice, this results in shorter exposure times and, as a consequence, time and energy are saved. Due to the improved sensitivities, it is also possible to reduce the amount of photoconductor in the photoconductive layer.

It is, however, a disadvantage of panchromatic sensitizations that the sensitized material cannot be processed in bright safelights which are physiologically favorable.

Many of the dyes which strongly sensitize in the red spectral region, preferably the dyes from the class of triphenylmethane dyes, produce a very broad sensitization, but the peak of this sensitization is generally not above about 650 nm. As a result, light sources emitting in the longer-wavelength region cannot be fully utilized, and it is also impossible to process the material in bright safelights without spoiling it.

According to U.S. Pat. No. 4,386,146, photoconductor layers for photosensitive papers containing titanium dioxide as the photoconductor are sensitized with widely differing cyanine dyes. The materials are intended for use in color electrophotography. From the fact that the cyanine dyes sensitize titanium dioxide it cannot be concluded, however, that they are also suitable for use in photoconductors, the electrophotographic behavior of which is different from that of titanium dioxide. The known cyanine dyes have a sensitizing action which covers a wide range of wavelengths. This is, however, a disadvantage if the material is to be processed and controlled in visible light in the darkroom.

SUMMARY OF THE INVENTION

It is, therefore, an object of the present invention to provide an electrophotographic recording material that displays a sensitization peak at about 670–680 nm, but which can be processed under bright safelights, for example, under yellow or green light.

It is also an object of the present invention to provide a sensitizing agent which permits sensitization of electrophotographic recording material to the entire red spectral region, but not to the green spectral region, and which is compatible with other sensitizers, such as dyes sensitizing in the shorter-wavelength spectral region.

In accomplishing the foregoing objects, there has been provided, in accordance with one aspect of the present invention, an electrophotographic recording material which comprises an electrically conductive support and a photoconductive layer comprising at least one organic photoconductor, a binder, and a sensitizing agent comprised of at least one bis-benzothiazole-pentamethine-cyanine represented by the formula:

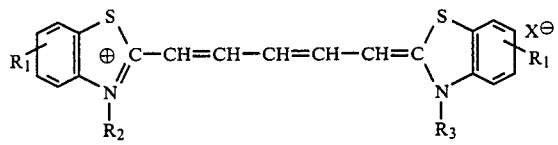

wherein
- $R_1$ denotes a hydrogen atom or a halogen atom, especially chlorine or bromine;
- $R_2$ denotes (i) an alkyl group having from 1 to 3 carbon atoms, (ii) $-(CH_2)_m-SO_3^-$ or (iii) $-(CH_2)_n-COO^-$;
- $R_3$ denotes (i) an alkyl group having from 1 to 3 carbon atoms, (ii) $(-CH_2)_mSO_3H$, (iii) $-(CH_2)_nCOOH$ or (iv) an alkali metal salt of (ii) or (iii), where m is 2 or 3 and n is 1 or 2;
- X denotes p-toluene sulfonate, bromide, iodide, perchlorate or, if $R_2$ denotes the (ii) or (iii) structure, nothing, said recording material displaying a sensitization peak in the range between about 680 nm and about 710 nm.

In accordance with another aspect of the present invention, the sensitizing agent of the aforementioned recording material further comprises a sensitizing dye which displays a sensitization peak below 670 nm, with a steep drop of sensitivity at the short-wave edge of the spectrum.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The accompanying FIGURE shows a sensitization spectrogram obtained for a photoconductor layer sensitized according to the present invention.

DETAILED DESCRIPTION OF THE PREFERRED EMBODIMENTS

In a preferred embodiment, the bis-benzothiazole-pentamethine-cyanine of the present invention represents a compound corresponding to the formula:

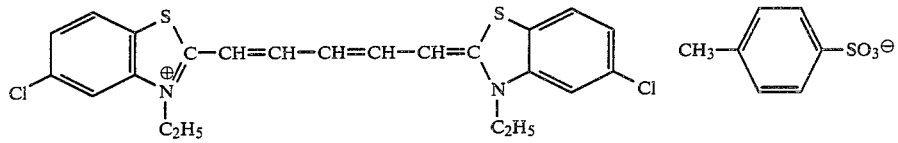

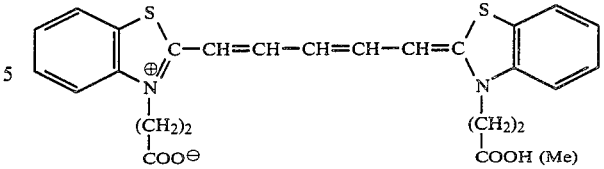

Additional dyes which may be used are listed in the accompanying table of formulas.

TABLE OF FORMULAS

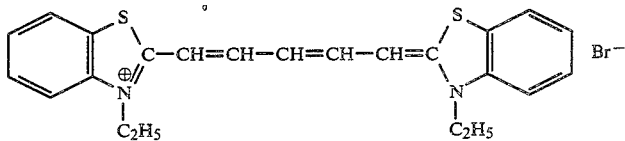

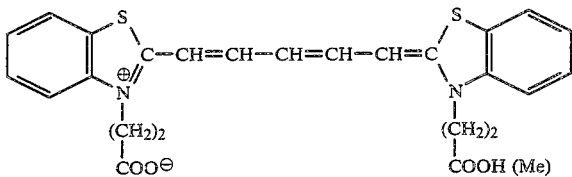

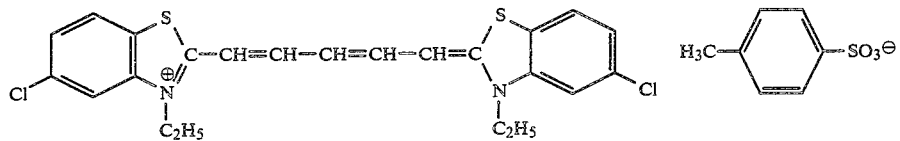

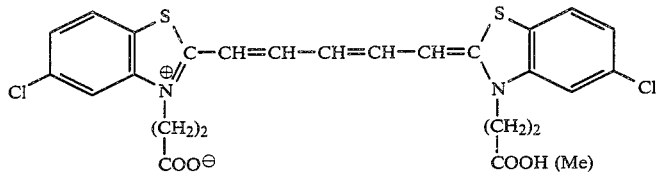

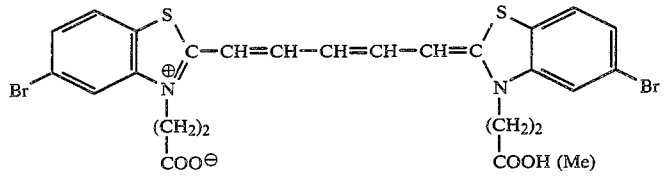

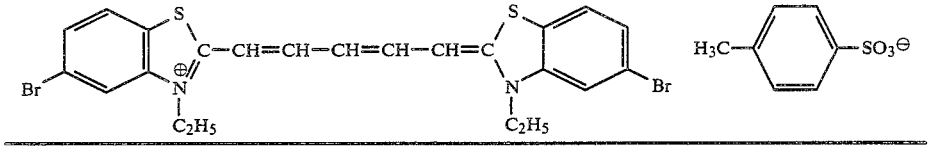

A cyanine dye corresponding to the following formula has also proven to be advantageous for use in the present invention:

In accordance with the present invention, a recording material can be provided which is safe for handling under green and/or yellow safelights and which displays a selective sensitization in the border region between the visible red and infrared spectral regions with a sensitization peak between about 680 nm and about 710 nm. The sensitization declines toward the shorter-wavelength end of the spectrum in such a way that the recording material is no longer sensitive in the green and greenish yellow regions.

By blending the bis-benzothiazole-pentamethine-cyanine dye according to the present invention, which dye sensitizes in the long-wave red spectral region, with dyes that sensitize only in the short-wave red spectral region, the entire red region can be sensitized comparatively uniformly and without a pronounced peak, while maintaining a gap in the green region of the spectrum. A good utilization of the red fraction of the exposure lamp up to the infrared region is thus ensured, while the gap in the green region makes it possible to process and visually control the recording material under bright safelights, for example, green safelights. Therefore, in a particular embodiment of the recording material of the present invention, the photoconductive layer additionally contains a sensitizing dye which has a sensitization peak below 670 nm, with a steep drop of sensitivity at the short-wave edge of the spectrum.

A sensitization of this kind can be effected by blending the above-described cyanine dye with a dye such as Acid Green (C.I. 42,095).

Many cyanine dyes, known from photography, are capable of effecting a spectral sensitization of silver halide. In contrast, sensitization varies when these dyes are used for electrophotographic recording materials. In many cases, sensitization is only slight or nonexistent, or a particular dye can only be used to sensitize organic photoconductors and is ineffective when used for inorganic photoconductors. It is generally impossible to predict whether dyes which are suitable sensitizers for silver halide photography are also suitable for use with photoconductors, especially with organic photoconductors. Moreover, the number of sensitizers which are known to have a good sensitizing effect in the long-wave red region is far smaller than the number of sensitizers known for the short-wave region of the spectrum. It was therefore unexpected that, by means of the sensitizing dye of the present invention, an advantageous, selective sensitization of the photoconductive layers comprising organic photoconductors is produced in the long-wave visible red spectral region.

When cyanine dyes are used, the sensitization peak of a photoconductor layer is generally only slightly displaced with respect to the absorption peak of the dye in alcohol and, in most cases, the sensitization peak is clearly positioned in the shorter wavelength direction, compared with the peak of photographic layers which have been sensitized with the same dye. The bis-benzothiazole-pentamethine-cyanine of the present invention, on the other hand, sensitizes a photoconductor and silver halide approximately in the same region, the sensitization peak being shifted by about 30 nm in the longer wavelength direction, compared with the absorption peak in alcohol.

In addition, the remaining residual staining of the photoconductive layer is only slight and, if necessary, it is more readily bleached by post-exposing than in the case of fast dyes which are used for sensitizing in this region.

The sensitizing dye according to formula 2 in the table of formulas, which dye is preferably used in the present invention, is distinguished by an intensive selective sensitization in the visible bright red region up to about 730 nm, with a sensitization peak at about 680 nm. This selective sensitization ensures high darkroom safety under yellow and green safelights and good utilization of the light emission of light sources which mainly or selectively emit in the bright red or up to the bright red, such as III/V diodes (light-emitting diodes, semiconductor lasers), gas lasers, dye lasers, incandescent lamps and xenon lamps.

Due to the gap in the green to yellowish green region, a higher degree of safety and an improved quality of the resulting products are additionally achieved, since operations can be visually controlled and working conditions are thus improved. The sensitization gap also makes it possible, for example, in the case of printed circuits, to use an original consisting of a flat of a printed circuit on a register sheet provided with red markings. These markings are not reproduced. At the same time, it is possible to work under greenish yellow safelights.

The sensitizing dyes according to the present invention are prepared using processes which are conventionally used for silver halide emulsions in the chemistry of sensitizing dyes, and which are known to a person skilled in the art.

The concentration of the sensitizing dyes of the present invention depends on the photoconductor used in each individual case, on the desired effect, and also on the sensitizing dyes used. Usually, the sensitizing dye is added in an amount of from about 0.01 to 5% by weight, based on the weight of the photoconductor.

Suitable organic photoconductors include monomeric and polymeric aromatic carbocyclic or heterocyclic compounds.

Oxdiazole derivatives, for example, 2,5-bis(4'-diethylaminophenyl)-1,3,4-oxdiazole, as described in German Pat. No. 1,058,836 (corresponding to U.S. Pat. No. 3,189,447) or oxazole derivatives, for example, 2-vinyl-4-(2'chlorophenyl)-5-(4''-diethylaminophenyl)-oxazole or 2-phenyl-4-(2'-chlorophenyl)-5-(4''-diethylaminophenyl)-oxazole, as described in German Pat. No. 1,060,260 (corresponding to U.S. Pat. No. 3,112,197) and in German Pat. No. 1,120,875 (corresponding to U.S. Pat. No. 3,257,203) are preferably used. Pyrazoline derivatives which are known from German Auslegeschrift No. 1,060,714 (corresponding to U.S. Pat. No. 3,180,729), and hydrazone compounds which are, for example, disclosed in German Offenlegungsschrift No. 2,919,791 (corresponding to U.S. Pat. No. 4,278,747), can also advantageously be used.

Suitable polymeric compounds include, for example, vinylaromatic polymers, for example, polyvinyl anthracene, polyacenaphthylene or copolymers. Poly-N-vinylcarbazole or copolymers of N-vinylcarbazole having an N-vinylcarbazole content of at least about 40% by weight have proven particularly useful.

As binders, natural and synthetic resins can be used which are known for their flexibility, film-forming properties and adhesion. Film-forming and electrical properties and, in view of their adhesion to the support, also solubility characteristics are important when choosing the binders. Suitable binders are, for example, polyester resins, such as copolyesters of isophthalic acid and terephthalic acid with glycol; silicone resins, such as three-dimensionally crosslinked phenyl-methyl siloxanes; and so-called "reaction resins" which are known as DD lacquers. Polycarbonate resins can also advantageously be used.

For the preferred use of the recording material of the present invention in the manufacture of printing plates, binders which are soluble in aqueous or alcoholic solvent systems with the addition if appropriate, of acid or alkali, are particularly suitable. Accordingly, suitable binders include high-molecular weight substances containing groups which render them alkali-soluble, such as acid anhydride groups, carboxyl groups, phenol groups, sulfonic acid groups, sulfonamide groups and sulfonimide groups. Copolymers with anhydride groups are particularly useful, since they do not contain any free acid groups, and the photoconductive layer therefore has a low dark conductivity, but is nevertheless readily soluble in alkaline media.

The supports used for the recording material may have a planar or cylindrical shape and may comprise a metal plate or a metal foil, metallized papers or papers or plastic films coated with an electrically conducting plastic material or with other conductive inorganic or organic substances, as is known in the art. The support preferably comprises a metal base or a metallized plastic film.

Toner images can be produced in a known manner directly on the recording material of the present invention. It is, however, also possible to transfer either the charge image generated or the toner image to an image receptor.

The electrophotographic recording material may comprise customary additives, such as levelling agents and plasticizers which are added to the photoconductive layer and/or adhesion promoters which are applied between the support and the photoconductive layer.

The invention will be further illustrated by the following examples, which are intended to be illustrative only and in no sense limiting.

EXAMPLE 1

A solution comprising 15 g of 2,5-bis-(4'-diethylaminophenyl)-1,3,4-oxdiazole, 15 g of a copolymer of styrene and maleic anhydride, 139 g of tetrahydrofuran, 40 g of butyl acetate, 91 g of ethylene glycol monomethyl ether, and 75 mg of the sensitizing dye denoted No. 3 in the accompanying table of formulas was applied to a 100 $\mu$m-thick polyester film which had been vacuum-metallized with aluminum. After evaporation of the solvent, an approximately 5 $\mu$m-thick photoconductive layer resulted which had a spectral sensitivity ranging from the short-wave red region to about 740 nm, and which had a sensitization peak at 690 nm.

The film was charged to about −450 V by means of a corona and was then exposed in a reprocamera equipped with 8 autophoto lamps of 500 W each, for 25 seconds. The original used for exposure was the flat of a printed circuit on a register sheet provided with red markings and orientation lines. These markings were not reproduced on the imagewise exposed film due to the light-sensitivity of the photoconductive layer in the above-mentioned spectral region.

After developing with an electrophotographic developer liquid and removing the photoconductive layer from the non-image areas, according to the method described in German Pat. No. 2,322,047 (corresponding to U.S. Pat. No. 4,066,453), the uncovered vapor-deposited aluminum layer was removed by treating it with a 2N sodium hydroxide solution. In this manner, a printed circuit was obtained.

EXAMPLE 2

A solution comprising 8 g of 2-vinyl-4-(2'-chlorophenyl)-5-(4''-diethylaminophenyl)-oxazole and 15 g of a copolymer of styrene and maleic anhydride, in a mixture of 90 g of ethylene glcyol monomethyl ether, 140 g of tetrahydrofuran and 40 g of butyl acetate, was admixed with 35 mg of the sensitizing dye denoted No. 1 in the table of formulas, and 15 mg of Acid Green (C.I. 42095, Acid Green 5). The solution was applied to an aluminum foil which had an electrochemically roughened and anodically oxidized surface and which had been pre-treated with polyvinylphosphonic acid, as described in German Offenlegungsschrift No. 1,621,478 (corresponding to U.S. Pat. No. 4,153,461). After evaporation of the solvent, a layer was obtained which had a photosensitivity ranging from greenish yellow to about 730 nm, with a broad maximum at 680 nm. On the one hand, the layer showed a good utilization of the light source employed and, on the other hand, made it possible to work in green light so that the operations could be visually controlled.

The following method was used to produce a printing plate for offset printing from the above-described recording material: The photoconductive layer was charged in the dark to −430 V with the aid of a corona and was then exposed in a reprocamera, for 10 seconds, at aperture f/14, using 10 metal halide lamps having an output of 600 W each as the light source. The resulting latent charge image was developed by applying a commercially available dry toner with the aid of a magnetic roll and the toner image was fixed by heating. The photoconductive layer was removed from the areas which were not covered by toner, using a solution prepared by dissolving 50 g of $Na_2SiO_3.9H_2O$ in 250 g of glycerol (86% strength) and diluting with 390 g of ethylene glycol and 310 g of methanol. As a result, a lithographic printing plate was obtained which could be used to produce a large print run.

EXAMPLE 3

A solution comprising 25 mg of the sensitizing dye according to formula 6 in 90 g of a solvent mixture prepared from 140 g of tetrahydrofuran, 40 g of butyl acetate and 90 g of ethylene glycol monomethyl ether, was admixed with 7.5 g of a copolymer of styrene and maleic anhydride (SCRIPSET 540 ®, produced by Monsanto Corp. of St. Louis, Mo., U.S.A.), which were slowly added with stirring at room temperature, and the mixture was thereafter stirred for 15 minutes. Then 5 g of the photoconductor 2-vinyl-4-(2'-chlorophenyl)-5-(4''-diethylaminophenyl)-oxazole were added. The coating solution was subsequently applied by spin coating to an aluminum support, the surface of which had been roughened by brushing, to give a dry coating weight of about 5 g/m$^2$ and the plate was further processed in the usual manner, as described in Example 2. The layer obtained showed a selective sensitization up to about 750 nm, with a peak at 690 nm. The material could be processed under green safelights and had a sensitivity characteristic as represented in the accompanying drawing.

The spectrogram in the FIGURE was obtained by exposure through an interference filter, using a linear stepless gray scale, followed by development with a dry toner.

Upon exposure through a filter (699 nm), at an intensity of 5.1 $\mu$W cm$^{-2}$ and an energy of 280 $\mu$J cm$^{-2}$, the sensitized photoconductive layer, which has previously been charged to −420 V is discharged to −50 V after 50 seconds.

EXAMPLE 4

When the sensitizing dye according to formula 2 and the photoconductor 2-vinyl-4-(2′-chlorophenyl)-5-(4″-diethylaminophenyl)-oxazole were used under the conditions indicated in Example 3, a selective sensitization in the red spectral region was obtained, with a peak at about 680 nm.

EXAMPLE 5

A solution of 8 g of 2-phenyl-4-(2′-chlorophenyl)-5-(4″-diethylaminophenyl)-oxazole and 8 g of styrene-maleic anhydride copolymer (SCRIPSET 550 ®) produced by Monsanto Corp. of St. Louis, Mo., U.S.A.), in 180 g of tetrahydrofuran was admixed with 150 mg of the sensitizing dye according to formula 3, which dye had been dissolved in methanol.

This solution was applied to an electrochemically roughened and anodically oxidized aluminum sheet, to give a 6 g/m² thick dry film after evaporation of the solvent.

The photoconductive layer thus obtained was charged in the dark to −722 V using a corona and was thereafter exposed to the light of a halogen lamp through an interference filter (band width 20 nm) at 664 nm. The energy ($E_{\frac{1}{2}}$) which was required to reduce the potential applied to the layer in the dark to one half of its value (−361 V) was 6.6 μJ cm$^{-2}$.

What is claimed is:

1. An electrophotographic recording material which comprises an electrically conductive support and a photoconductive layer comprising (a) at least one organic photoconductor selected from the group consisting of an oxazole, an oxdiazole, a hydrazone and a pyrazoline, (b) a binder, and (c) a sensitizing agent comprised of at least one bis-benzothiazole-pentamethine-cyanine represented by the formula:

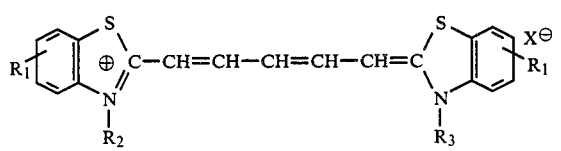

wherein $R_1$ denotes a hydrogen atom or a halogen atom;

$R_2$ denotes (i) an alkyl group having from 1 to 3 carbon atoms, (ii) —(CH$_2$)$_m$—SO$_3^-$ or (iii) —(CH$_2$)$_n$—COO$^-$;

$R_3$ denotes (i) an alkyl group having from 1 to 3 carbon atoms, (ii) —(CH$_2$)$_m$SO$_3$H, (iii) —(CH$_2$)$_n$COOH or (iv) an alkali metal salt of (ii) or (iii), where m is 2 or 3 and n is 1 or 2; and X denotes p-toluene sulfonate, bromide, iodide, perchlorate or, if R$_2$ denotes the (ii) or (iii) structure, nothing, said recording material displaying a sensitization peak in the range between about 680 nm and about 710 nm.

2. A recording material as claimed in claim 1, wherein R$_1$ denotes chlorine or bromine.

3. A recording material as claimed in claim 1 wherein said bis-benzothiazole-pentamethine-cyanine comprises a compound represented by the formula:

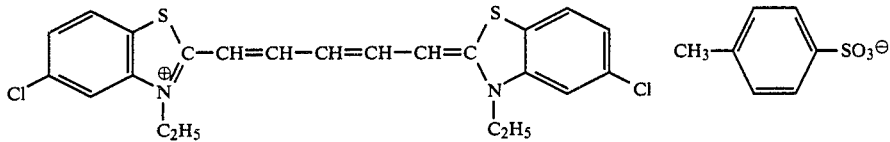

4. A recording material as claimed in claim 1 wherein the said bis-benzothiazole-pentamethine-cyanine comprises a compound represented by the formula:

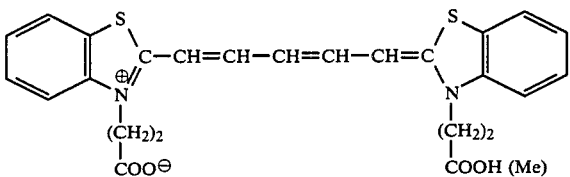

wherein (Me) denotes an alkali metal.

5. A recording material as claimed in claim 1, wherein said sensitizing agent further comprises a sensitizing dye which displays a sensitization peak below 670 nm, with a steep drop of sensitivity at the short-wave edge of the spectrum.

6. A recording material as claimed in claim 5, wherein said sensitizing dye comprises Acid Green (C.I. 42,095).

7. A recording material as claimed in claim 1, wherein the photoconductor comprises 2,5-bis-(4′-diethylaminophenyl)-1,3,4-oxdiazole.

8. A recording material as claimed in claim 1, wherein the photoconductor comprises 2-vinyl-4-(2′-chlorophenyl)-5-(4″-diethylaminophenyl)-oxazole.

9. A recording material as claimed in claim 1, wherein the photoconductor comprises 2-phenyl-4-(2′-chlorophenyl)-5-(4″-diethylaminophenyl)-oxazole.

10. A recording material as claimed in claim 1, wherein said support comprises a metal base or a metallized plastic film.

11. A recording material as claimed in claim 1, wherein said binder comprises a styrene-maleic anhydride copolymer or a phenol resin.

* * * * *